United States Patent
Pacella et al.

(10) Patent No.: US 10,171,621 B2
(45) Date of Patent: Jan. 1, 2019

(54) AGGREGATING SUBSCRIPTION INFORMATION AND REQUESTING CONTENT OBJECTS BASED ON AGGREGATED SUBSCRIPTION INFORMATION

(71) Applicant: Verizon Patent and Licensing Inc., Arlington, VA (US)

(72) Inventors: Dante J. Pacella, Charles Town, WV (US); Mani Tadayon, Leesburg, VA (US); Ashish Sardesai, Ashburn, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 320 days.

(21) Appl. No.: 15/159,679

(22) Filed: May 19, 2016

(65) Prior Publication Data

US 2017/0339245 A1    Nov. 23, 2017

(51) Int. Cl.
  *G06F 15/16*    (2006.01)
  *H04L 29/08*    (2006.01)
  *H04L 12/911*   (2013.01)
  *H04W 4/18*     (2009.01)

(52) U.S. Cl.
  CPC ............. *H04L 67/32* (2013.01); *H04L 47/70* (2013.01); *H04L 67/2838* (2013.01); *H04L 67/306* (2013.01); *H04W 4/18* (2013.01)

(58) Field of Classification Search
  CPC ..... H04L 67/32; H04L 47/70; H04L 67/2838; H04L 67/306; H04W 4/18

USPC ......................................................... 709/219
See application file for complete search history.

(56) References Cited

U.S. PATENT DOCUMENTS

| | | | | |
|---|---|---|---|---|
| 2004/0103120 | A1* | 5/2004 | Fickle ..................... | G06Q 10/10 |
| 2006/0087987 | A1* | 4/2006 | Witt .................. | G06F 17/30017 370/260 |
| 2008/0120129 | A1* | 5/2008 | Seubert .................. | G06Q 10/06 705/35 |
| 2014/0006423 | A1* | 1/2014 | Melnychenko ..... | G06F 17/3053 707/749 |

OTHER PUBLICATIONS

Wikipedia, "Content centric networking," https://en.wikipedia.org/wiki/Content_centric_networking, Feb. 22, 2016, 5 pages.

(Continued)

*Primary Examiner* — Sm A Rahman

(57) ABSTRACT

A device may receive first subscription information from a first user device. The device may receive second subscription information from a second user device. The device may aggregate the first subscription information and the second subscription information to form aggregated subscription information. The aggregated subscription information may be associated with receiving aggregated content from a content delivery server. The device may receive the aggregated content from the content delivery server based on the aggregated subscription information. The device may provide a first portion of the aggregated content to the first user device. The device may provide a second portion of the aggregated content to the second user device.

20 Claims, 8 Drawing Sheets

(56) References Cited

OTHER PUBLICATIONS

Wikipedia, "Information-centric networking," https://en.wikipedia.org/wiki/Information-centric_networking, Dec. 3, 2015, 2 pages.
Wikipedia, "Named data networking," https://en.wikipedia.org/wiki/Named_data_networking, Feb. 12, 2016, 10 pages.

* cited by examiner

AGGREGATING SUBSCRIPTION INFORMATION AND REQUESTING CONTENT OBJECTS BASED ON AGGREGATED SUBSCRIPTION INFORMATION

BACKGROUND

In an information-centric network and/or a content-centric network, a user device may request content using a data identifier instead of an Internet protocol (IP) address. For example, a user device may request content by transmitting an interest indicator to a content delivery server. An interest indicator may identify a namespace (e.g., a set of symbols that are used to organize objects for reference, such as content objects), and may include a content object identifier that identifies a content object associated with the content that the user device is requesting. The user device may receive the content in the form of content objects from the content delivery server. A content object may include the requested content as a payload of data.

DETAILED DESCRIPTION OF PREFERRED EMBODIMENTS

The following detailed description of example implementations refers to the accompanying drawings. The same reference numbers in different drawings may identify the same or similar elements.

In an information-centric network (ICN) and/or a content-centric network, a user device (e.g., a smart phone, a personal computer, or an Internet-connected television) may request a content object, associated with content, from a content delivery server. For example, the user device may request the content object by transmitting an interest indicator to the content delivery server via a network device (e.g., a router, a switch, or a server). The interest indicator may include information indicating a namespace, associated with the content object, and a content object identifier that identifies the content object. To request multiple content objects using multiple interest indicators, the user device may store multiple content object identifiers and associated namespaces. This may be resource intensive because storing the associations consumes significant memory resources. Further, the network device may receive and provide multiple interest indicators for the same content objects when multiple user devices are requesting the same content, which consumes computing resources of the network device and consumes network resources.

Implementations described herein enable a network device to aggregate interest indicators, and associated attributes, from one or more user devices and to request content objects from a content delivery server based on the aggregation. This increases an efficiency of requesting content from the content delivery server by reducing a quantity of interest indicators that the network device transmits to the content delivery server. In addition, implementations described herein enable a user device to request a content object from a content delivery server without storing a content object identifier prior to requesting the content object. This conserves computing and/or memory resources of the user device by reducing and/or eliminating the need for the user device to store content object identifiers.

Figure 1A:
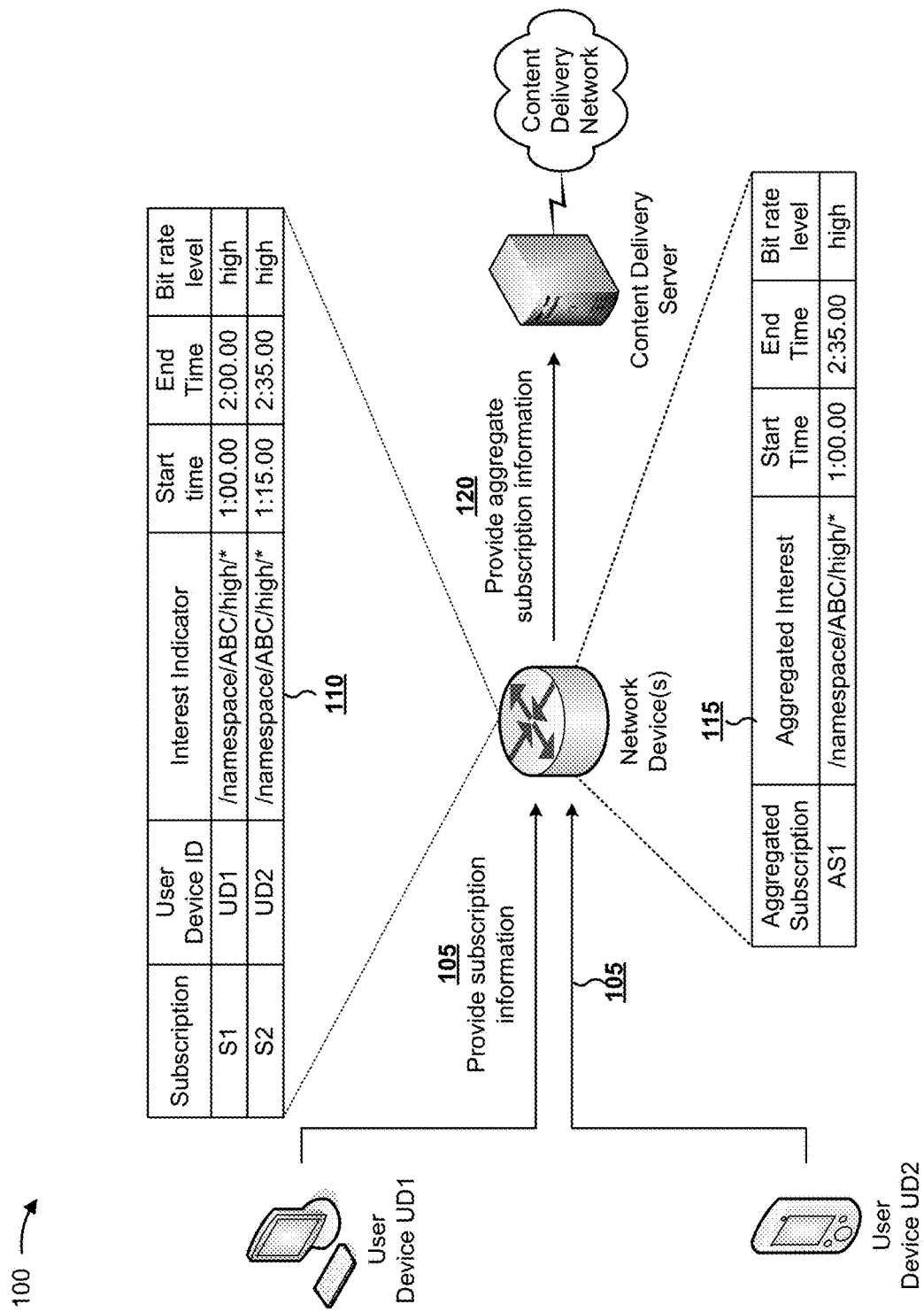
FIGS. 1A-1D are diagrams of an overview of an example implementation described herein.

FIGS. 1A-1D are diagrams of an overview of an example implementation 100 described herein. As shown in FIG. 1A, and by reference number 105, one or more user devices may provide subscription information to one or more network device(s) (e.g., routers, switches, or servers). The subscription information may be associated with a subscription (e.g., a single request for content that includes an interest indicator and associated attributes). As shown by reference number 110, the network device(s) may store the subscription information. For example, the network devices may store user device identifiers (e.g., internet protocol (IP) addresses or media access control (MAC) addresses, shown as "UD1" and "UD2" for simplicity), interest indicators associated with the subscriptions, a start time for the subscriptions, an end time for the subscriptions, and/or a bit rate level for the subscriptions.

In some implementations, an interest indicator may include a static portion that is the same for different content objects requested in association with a subscription (e.g., shown as /namespace/ABC/high, /namespace/XYZ/med, and /namespace/XYZ/low). Additionally, or alternatively, an interest indicator may include a dynamic portion that is different for different content objects requested in association with a subscription (e.g., shown as "/*," where the * is a wildcard character indicating a request for all content objects associated with the static portion of the interest indicator). In some implementations, the dynamic portion of the interest indicators may include a content object identifier that identifies a particular content object being requested, as described below. In some implementations, content objects may include multimedia content, such as audio content or video content.

As shown by reference number 115, the network device(s) may aggregate the subscriptions from multiple user devices to form an aggregated subscription. For example, the network device(s) may aggregate subscriptions S1 and S2 to form aggregated subscription AS1, based on subscriptions S1 and S2 including the same interest indicator and the same bit rate level. When aggregating subscriptions S1 and S2, the network device(s) may determine the start time for aggregated subscription AS1 as 1:00.00 coordinated universal time (UTC) based on subscription S1 having a start time of 1:00.00 UTC, which is an earlier start time than subscription S2. Similarly, the network device(s) may determine the end time for aggregated subscription AS1 as 2:35.00 UTC, based on subscription S2 having an end time of 2:35.00 UTC, which is a later end time than subscription S1. As shown by reference number 120, the network device(s) may provide the aggregated subscriptions to a content delivery server to request content objects.

Figure 1B:
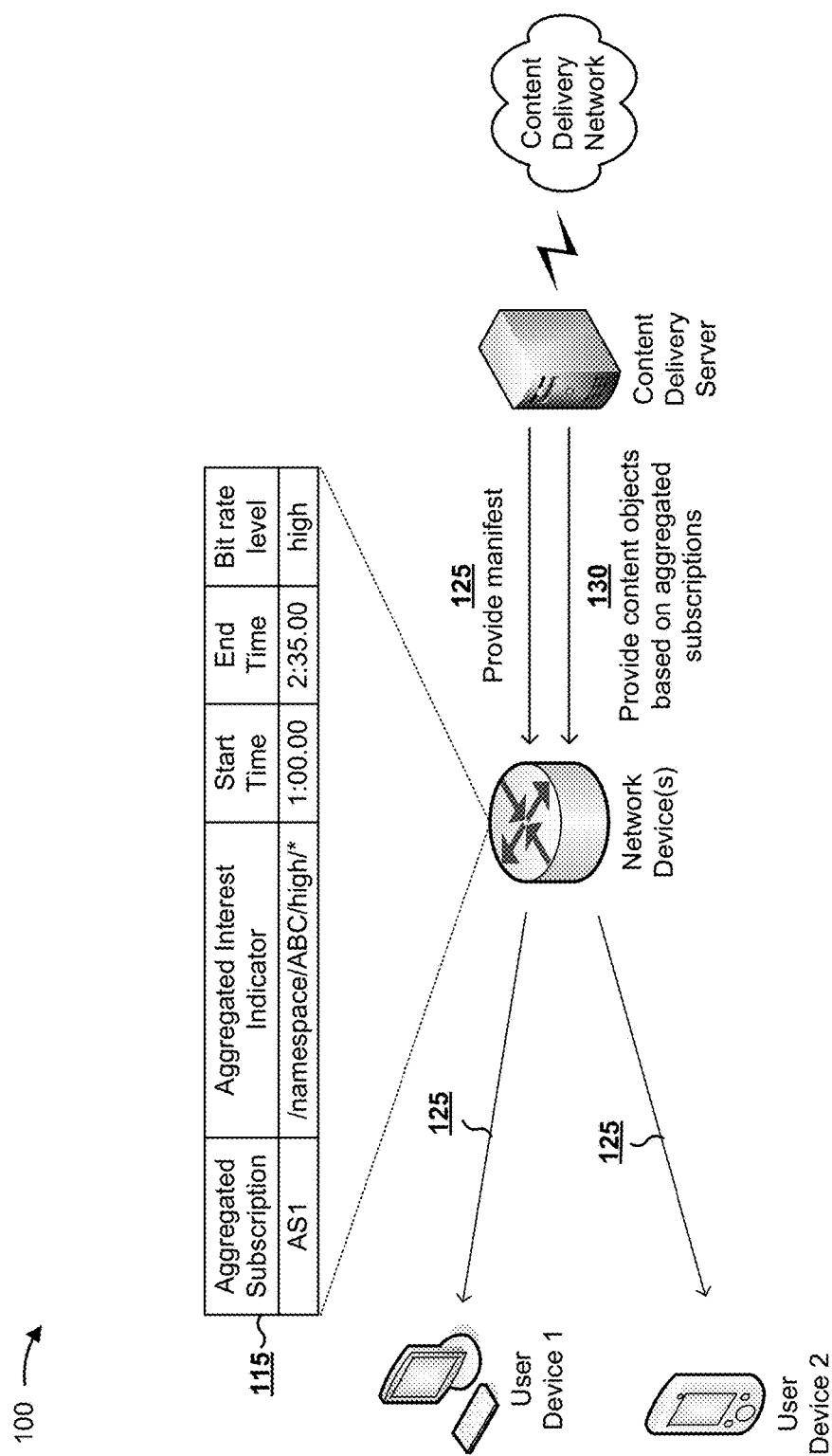

As shown in FIG. 1B, and by reference number 125, the content delivery server may provide a manifest file to user devices UD1 and UD2, via the network device(s). The manifest file may include instructions for generating a content object identifier, such as when a user device fails to receive a particular content object and has to request the particular content object using an associated content object identifier.

As shown by reference number 130, the content delivery server may provide the content objects to the network device(s) based on the aggregated subscriptions. Because the aggregated subscription information indicates a request for all content objects associated with the aggregated subscriptions (e.g., via use of the wildcard character), the content delivery server may provide the content objects seamlessly (e.g., without skipping particular content objects). For example, the content delivery server may provide content objects to the network device(s) for aggregated subscription AS1 starting at 1:00.00 UTC and ending at 2:35.00 UTC.

Figure 1C:
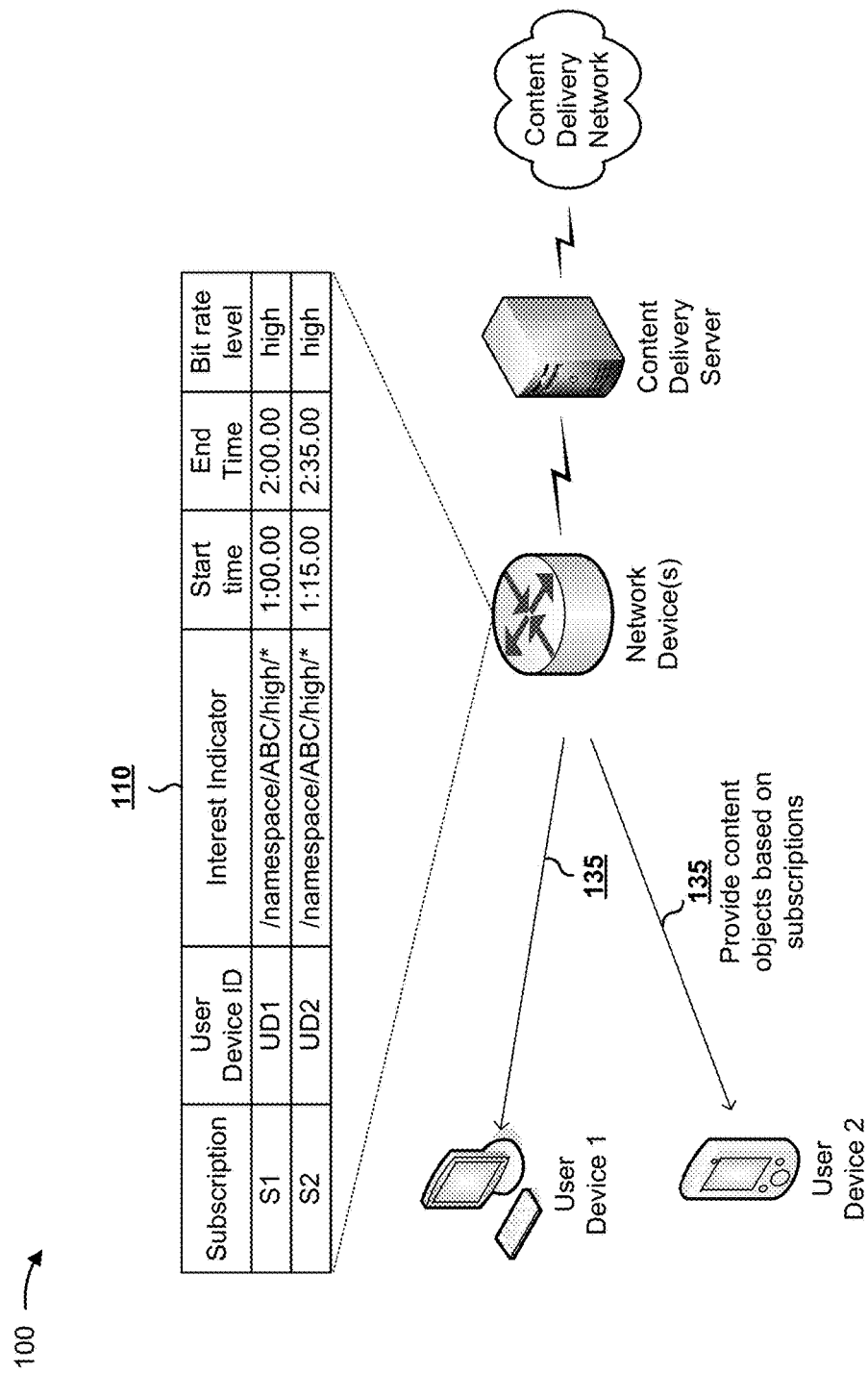

As shown in FIG. 1C, and by reference number 135, the network device(s) may provide the content objects to user devices UD1 and UD2 based on the particular subscriptions associated with user devices UD1 and UD2. For example, the network device(s) may provide the content objects for subscription S1 to UD1 starting at 1:00.00 UTC and ending at 2:00.00 UTC and for subscription S2 starting at 1:15.00 UTC and ending at 2:35.00.

Figure 1D:
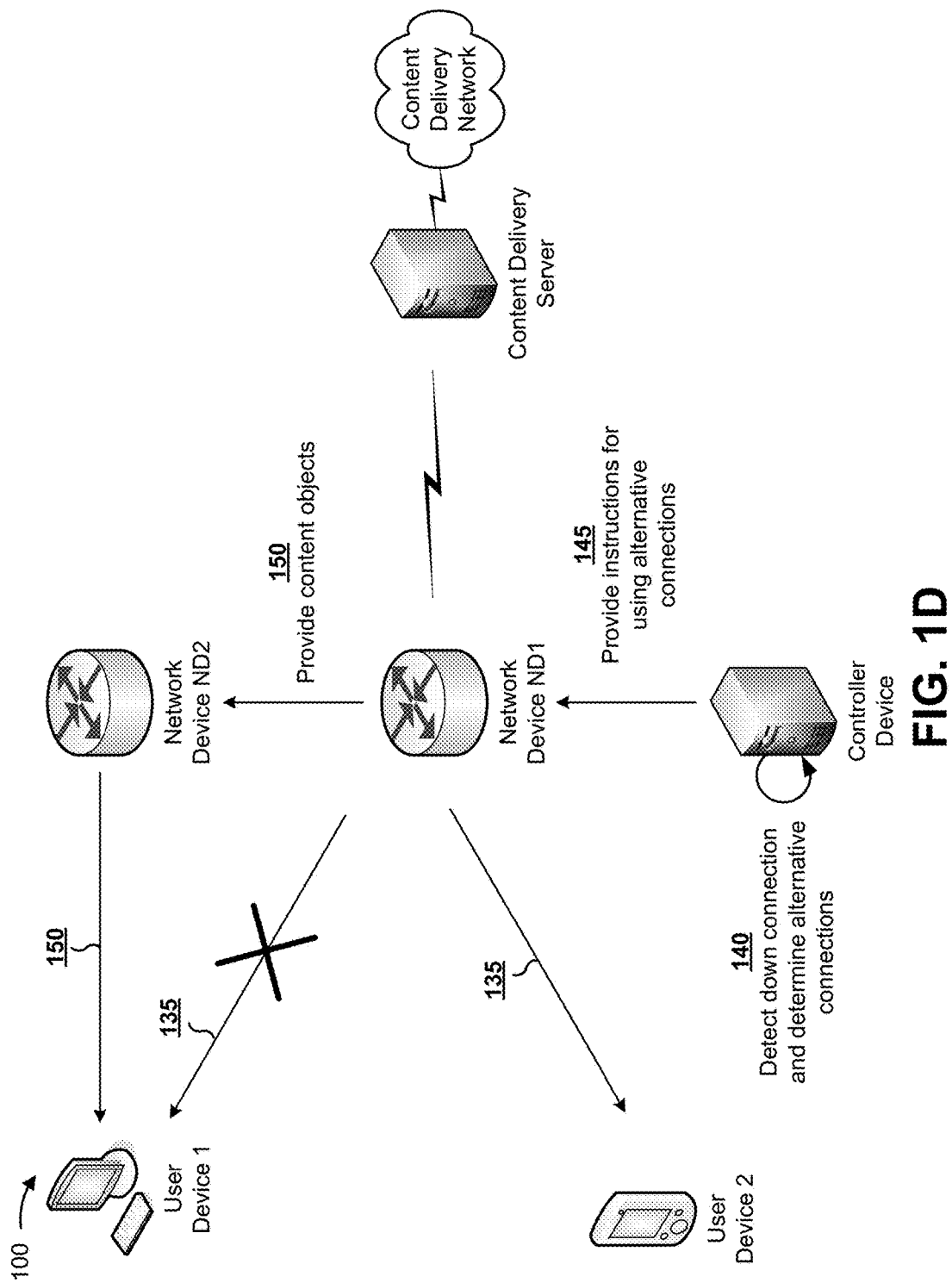

As shown in FIG. 1D, and by reference number 140, while the network device(s) are providing content objects to user devices UD1 and UD2, a controller device may detect a down connection status for the connection (e.g., communication session) between network device ND1 and user device UD1. Based on detecting the down connection status, the controller device may determine a set of alternative connections (e.g., an alternate route) for providing the content objects to user device UD1 that bypasses the down connection. For example, the controller device may determine that the down connection can be avoided by having network device ND1 provide the content objects destined for user device UD1 to network device ND2 and having network device ND2 provide the content objects to user device UD1.

As shown by reference number 145, the controller device may provide the instructions for using the set of alternative connections to network device ND1. As shown by reference number 150, network device ND1 may provide the content objects to network device ND2, which network device ND2 may provide to user device UD1 based on the instructions.

In this way, a network device may aggregate subscriptions from one or more user devices and request content objects from a content delivery server using an aggregated subscription. This conserves computing resources and network resources by reducing a quantity of requests that the network device transmits to the content delivery server when requesting the content objects. In addition, this enables a user device to subscribe to content without using a content object identifier, thereby increasing an efficiency of requesting content objects by reducing and/or eliminating the need for the user device to store content object identifiers.

As indicated above, FIGS. 1A-1D are provided merely as an example. Other examples are possible and may differ from what was described with regard to FIGS. 1A-1D.

Figure 2:
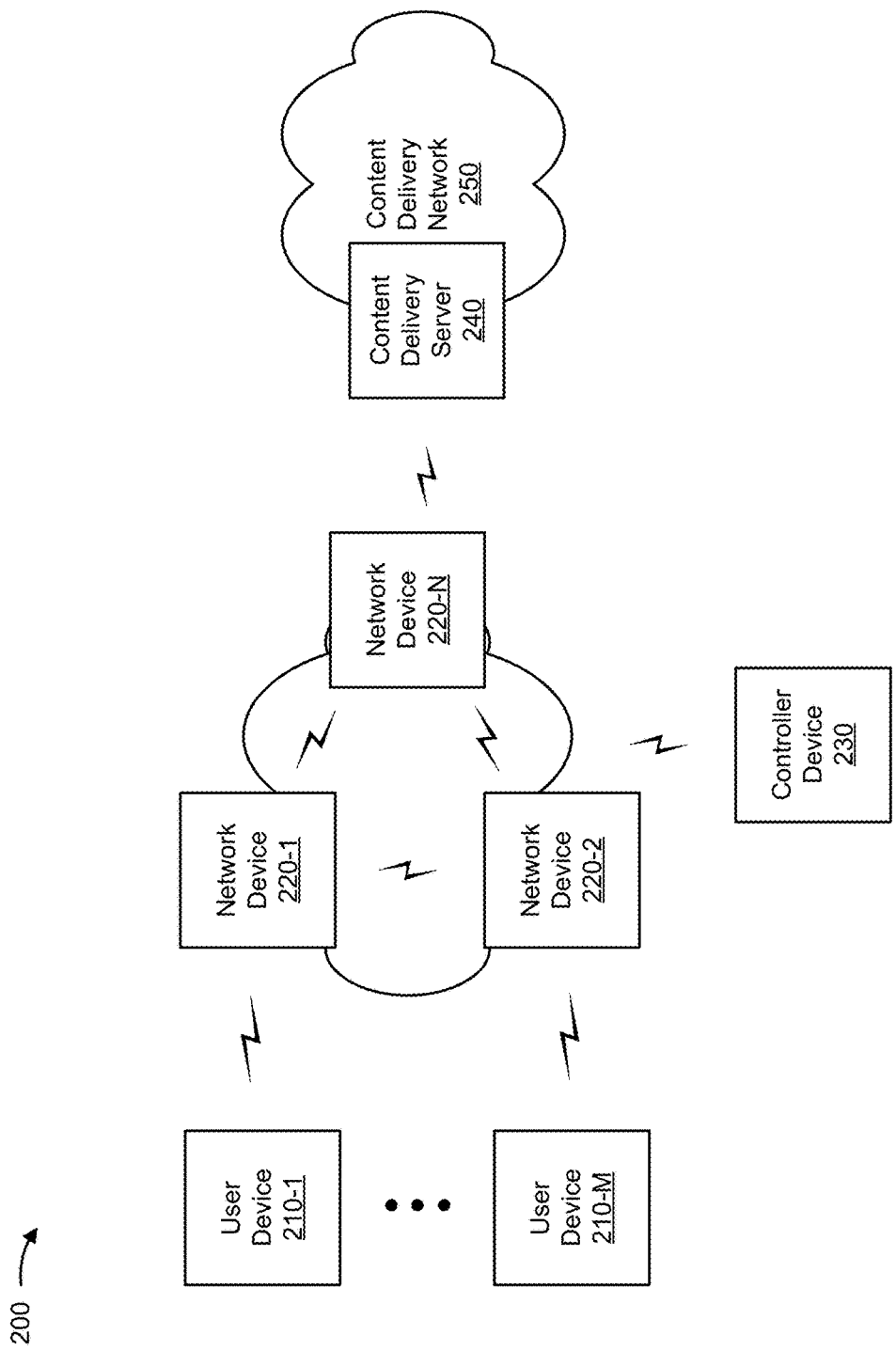
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more user devices 210-1 through 210-M (M>1) (hereinafter referred to collectively as "user devices 210," and individually as "user device 210"), one or more network devices 220-1 through 220-N (N>1) (hereinafter referred to collectively as "network devices 220," and individually as "network device 220"), a controller device 230, a content delivery server 240, and a content delivery network 250. Devices of environment 200 may interconnect via wired connections, wireless connections, or a combination of wired and wireless connections.

User device 210 includes one or more devices capable of providing subscription information, associated with a subscription for content, to network device 220. For example, user device 210 may include a communication and/or computing device, such as a mobile phone (e.g., a smart phone or a radiotelephone), a desktop computer, a laptop computer, a tablet computer, a digital video recorder (DVR), a set top box, a television, a gaming device, a wearable communication device (e.g., a smart wristwatch, a pair of smart eyeglasses, etc.), or a similar type of device. In some implementations, user device 210 may provide subscription information to network device 220 for aggregation and/or to receive content objects from content delivery server 240 via network device 220, as described in more detail elsewhere herein.

Network device 220 includes one or more devices capable of receiving and aggregating subscription information. For example, network device 220 may include a traffic transfer device, such as a router, a switch, a hub, a gateway, a server, a base station, or a similar type of device. In some implementations, network device 220 may receive subscription information from user device 210, may aggregate the subscription information with other subscription information, and may request content objects from content delivery server 240 using the aggregated subscription information, as described in more detail elsewhere herein. Additionally, or alternatively, network device 220 may receive subscription information from user device 210 and provide the subscription information to a different network device 220 for aggregation, as described elsewhere herein.

In some implementations, network device 220 may receive content objects from content delivery server 240 and/or may provide the content objects to user device 210 based on the subscription information, as described in more detail elsewhere herein. Additionally, or alternatively, a network device 220 may receive content objects from content delivery server 240 and may provide the content objects to other network devices 220 for providing to one or more user devices 210, as described elsewhere herein.

Controller device 230 includes one or more devices capable of detecting a connection status and determining alternative connections for providing content objects. For example, controller device 230 may include a router, a switch, a hub, a gateway, a server, or a similar type of device. In some implementations, controller device 230 may detect that a connection between user device 210 and network device 220 is down or experiencing congestion, and may determine alternative connections for providing content objects to user device 210 (e.g., via another network device 220 or set of network devices 220) that bypass the down or congested connection, as described in more detail elsewhere herein.

Content delivery server 240 includes one or more devices capable of receiving requests for content and providing the content based on the requests (e.g., subscription requests). For example, content delivery server 240 may include one or more servers (e.g., included in a data center). In some implementations, content delivery server 240 may receive aggregated subscriptions, and may provide content based on the aggregated subscriptions, as described in more detail elsewhere herein.

Content delivery network 250 includes one or more wired and/or wireless networks. In some implementations, content delivery network 250 may include a distributed system of content delivery servers 240 (e.g., in one or more data centers) to receive media content (e.g., from a content provider) and to provide the media content for distribution. For example, content delivery network 250 may include a wide area network (WAN), a metropolitan area network (MAN), a cellular network, a public land mobile network (PLMN), a local area network (LAN), a telephone network (e.g., a Public Switched Telephone Network (PSTN)), a private network, an ad hoc network, an intranet, the Internet, a fiber optic-based network, a television network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
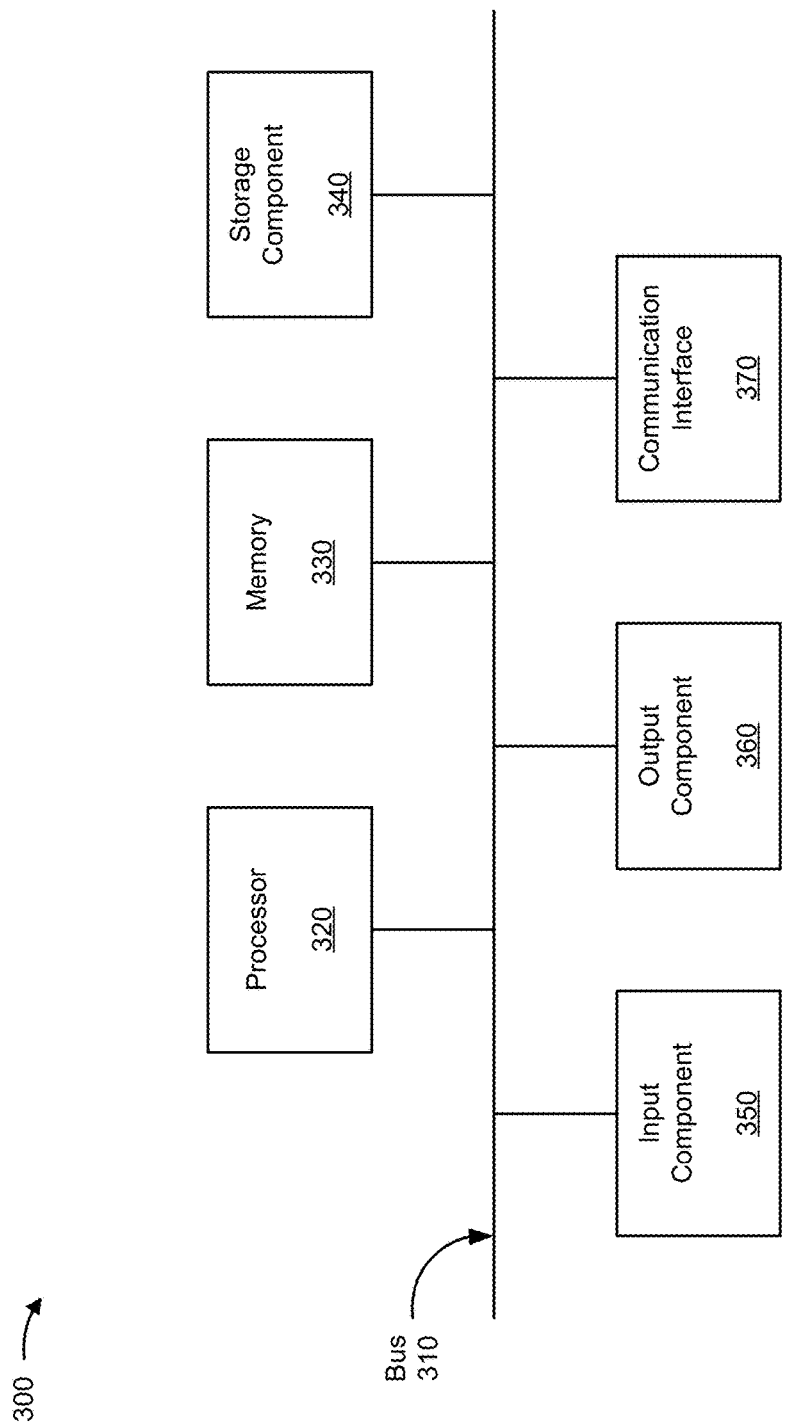
FIG. 3 is a diagram of example components of one or more devices of FIG. 2.

FIG. 3 is a diagram of example components of a device 300. Device 300 may correspond to user device 210, network device 220, controller device 230, and/or content delivery server 240. In some implementations, user device 210, network device 220, controller device 230, and/or content delivery server 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
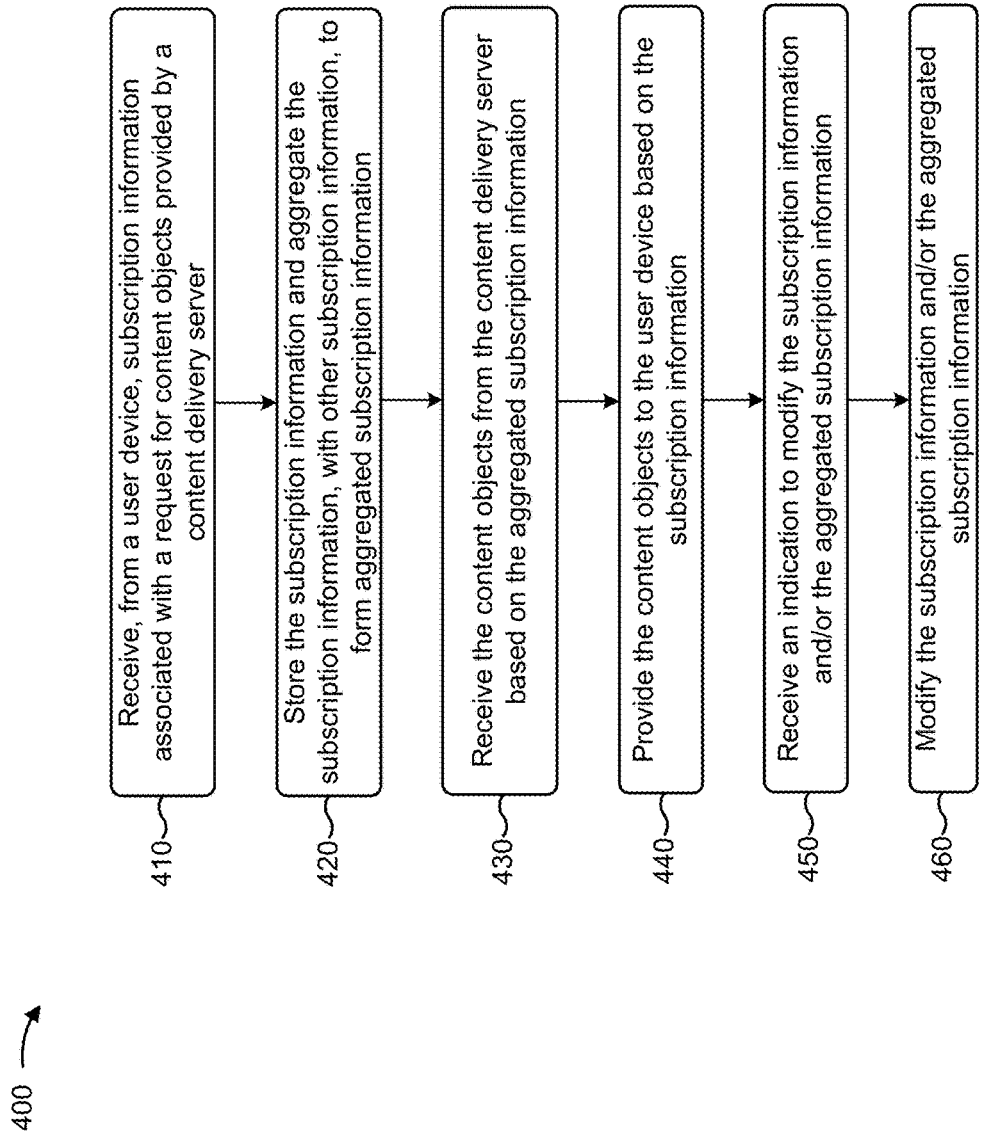
FIG. 4 is a flow chart of an example process for aggregating subscription information and requesting content objects based on aggregated subscription information.

FIG. 4 is a flow chart of an example process 400 for aggregating subscription information and requesting content objects based on aggregated subscription information. In some implementations, one or more process blocks of FIG. 4 may be performed by network device 220. In some implementations, one or more process blocks of FIG. 4 may be performed by another device or a group of devices separate from or including network device 220, such as user device 210, controller device 230, and/or content delivery server 240.

As shown in FIG. 4, process 400 may include receiving, from a user device, subscription information associated with a request for content objects provided by a content delivery server (block 410). For example, network device 220 may receive subscription information from user device 210 when a user of user device 210 interacts with user device 210 to subscribe to content (e.g., live or pre-recorded content, such as a sporting event, a television show, a movie, a concert, a podcast, an audiobook, or a music stream). As another example, a first device in the Internet of things (IoT), such as a sensor, may receive subscription information from a second device in the IoT, such as user device 210, when the second device powers on and requests content from the first IoT device (e.g., sensor data, such as weather data). In some implementations, network device 220 may receive subscription information from user devices 210 in association with a request for content objects (e.g., payloads of data used to deliver content, segments of the content, or the like).

In some implementations, the subscription information may include an interest indicator (e.g., information that indicates an interest). For example, the interest indicator may be associated with a request for content objects and may include a static portion, such as a namespace indicator (e.g., a set of characters used to organize content objects, such as a name of a content provider and/or a title of the content), and a dynamic portion, such as a content object identifier that identifies a content object being requested. In some implementations, the content object identifier may include a content object tag (e.g., information that describes the content objects). Additionally, or alternatively, the subscription information may include information that indicates attributes (e.g., attribute indicators) associated with the interest indicator. For example, the subscription information may include information that indicates a start time, an end time, and/or a desired bit rate level associated with the request of the content objects.

In some implementations, the subscription information may be associated with a request for a content objects associated with a namespace indicator. For example, the subscription information may include an interest indicator that includes a namespace indicator. In some implementations, the subscription information may be associated with a request for all content objects associated with a particular namespace indicator. For example, the subscription information may include an interest indicator that includes a particular namespace indicator and a wildcard character, representing a request for all content objects associated with the particular namespace indicator.

In some implementations, network device 220 may receive, from the content delivery server, a manifest file that includes instructions for identifying content objects and may provide the manifest file to the user device. For example, network device 220 may receive a file containing metadata associated with the content objects that user device 210 is requesting. In some implementations, the manifest file may include instructions for identifying content objects (e.g., an algorithm, a hash, a function, a formula, a method, an equation, or an expression), content object tags (e.g., information that describes the content objects), and/or a listing of content object identifiers associated with the aggregated subscription (e.g., as in the case of pre-recorded content, where content identifiers may be known prior to publishing by content delivery server 240). In some implementations, network device 220 may provide the manifest file to user device 210, to enable user device 210 to determine content object identifiers using the instructions, as described below.

As further shown in FIG. 4, process 400 may include storing the subscription information and aggregating the subscription information, with other subscription information, to form aggregated subscription information (block 420). For example, network device 220 may store the subscription information and associated user device identifiers that identify particular user devices 210. In some implementations, network device 220 may aggregate the subscription information with other subscription information, received from user device 210 and/or other user devices 210, to form aggregated subscription information (e.g., aggregated requests for content).

In some implementations, network device 220 may receive subscription information from multiple user devices 210. For example, network device 220 may receive first subscription information from a first user device 210 and second subscription information from a second user device 210. In some implementations, a first network device 220 may receive subscription information for aggregation from one or more other network devices 220, which have received the subscription information from one or more user devices 210. This conserves memory resources of the one or more other network devices 220 by having the first network device store aggregated subscription information (e.g., rather than having the one or more other network devices 220 store aggregated subscription information).

In some implementations, network device 220 may aggregate the first subscription information and the second subscription information to form aggregated subscription information, which network device 220 may use to request content objects from content delivery server 240. This conserves network resources and computing resources of network device 220 by preventing network device 220 from requesting the same content objects multiple times for multiple user devices 210.

In some implementations, network device 220 may aggregate the subscription information based on the interest indicators. For example, network device 220 may aggregate first subscription information and second subscription information when the first subscription information and the second subscription information include the same interest indicator or an interest indicator that identifies at least one content object that is the same among the interest indicators.

In some implementations, network device 220 may aggregate the subscription information based on attributes. For example, network device 220 may aggregate first subscription information and second subscription information when the first subscription information and the second subscription information include the same interest indicators and indicate the same bit rate level. Conversely, network device 220 may prevent aggregation of first subscription information and second subscription information when the first subscription information and the second subscription information include the same interest indicators but the first subscription information and the second subscription information indicate different bit rate levels. In other words, network device 220 may maintain the first subscription information and the second subscription information separately, which enables network device 220 to provide content objects at different bit rate levels, thereby improving the providing of the content objects.

In some implementations, network device 220 may receive first subscription information that indicates an attribute, such as a bit rate level, and second subscription information that includes the same interest indicator as the first subscription information but that does not indicate an attribute (e.g., does not indicate a bit rate level). In this case, network device 220 may use the first subscription information, which indicates the attribute, as the aggregated subscription information for the first subscription information and the second subscription information, thereby conserving memory resources relative to storing the first subscription information and the second subscription information separately.

In some implementations, network device 220 may aggregate first subscription information and second subscription information that include the same interest indicators but that indicate different start times and end times. In some implementations, the different start times and end times may at least partially overlap in time. For example, network device 220 may aggregate first subscription information and second subscription information where the first subscription information indicates a start time of 1:00.00 UTC and an end time of 2:00.00 UTC but the second subscription information indicates a start time of 1:30.00 UTC and an end time of 2:30.00 UTC.

In some implementations, when aggregating the subscription information, network device 220 may determine an aggregated start time and an aggregated end time for the delivery of the content objects based on the start times and the end times indicated by the subscription information. In some implementations, network device 220 may determine an aggregated start time, for the aggregated subscription information, based on the subscription information associated with the earliest start time (e.g., relative to the start times indicated by other subscription information for the same interest indicator). For example, network device 220 may determine that the start time indicated by first subscription information is earlier than the start time indicated by second subscription information. In this case, network device 220 may use the start time indicated by the first subscription information as the aggregated start time for the aggregated subscription.

In some implementations, network device 220 may determine an aggregated end time, for the aggregated subscription information, based on the relative end times for the subscription information. For example, network device 220 may determine that the end time indicated by second subscription information is later than the end time indicated by first subscription information. In this case, network device 220 may use the end time indicated by the second subscription information as the aggregated end time for the aggregated subscription.

In some implementations, network device 220 may store the aggregated subscription information, and may provide the aggregated subscription information to content delivery server 240, which may conserve computing resources of network device 220 by having network device 220 provide aggregated subscription information (e.g., rather than separately providing subscription information for multiple user devices 210).

As further shown in FIG. 4, process 400 may include receiving the content objects from the content delivery server based on the aggregated subscription information (block 430) and providing the content objects to the user device based on the subscription information (block 440). For example, network device 220 may receive content objects starting at the aggregated start time indicated by the aggregated subscription information and may cease receiving the content objects at the aggregated end time indicated by the aggregated subscription information. In some implementations, network device 220 may provide the content objects to user devices 210 after, or in association with, receiving the content objects from content delivery server 240.

In some implementations, network device 220 may store user device identifiers (e.g., IP addresses or MAC addresses) that identify user devices 210 and corresponding subscription information to determine when to provide user devices 210 with content objects and to determine which content objects to provide. In some implementations, network device 220 may provide the content objects to particular user devices 210 based on the subscription information (i.e., the non-aggregated subscription information). For example, assume that the aggregated subscription information indicates an aggregated start time of 1:00.00 UTC and an aggregated end time of 2:35.00 UTC for receiving content objects. Further assume, for example, that first subscription information indicates that a first user device 210 is to receive the content objects starting at 1:00.00 UTC and ending at 2:00.00 UTC and that second subscription information indicates that a second user device 210 is to receive the content objects starting at 1:15.00 UTC and ending at 2:35.00 UTC.

In this case, network device 220 may provide the content objects to the first user device 210 from 1:00.00 UTC to 1:14.59 UTC based on the first subscription information, to both the first user device 210 and the second user device 210 from 1:15.00 UTC to 2:00.00 UTC based on the first and the second subscription information, and to the second user device 210 from 2:00.01 UTC to 2:35.00 UTC based on the second subscription information.

In some implementations, network device 220 may store network device 220 identifiers (e.g., IP addresses or MAC addresses) that identify other network devices 220 and the corresponding subscription information received from the other network devices 220. In this case, network device 220 may provide the content objects to the other network devices 220, which may then use stored user device 210 identifiers and corresponding subscription information to provide the content objects to user devices 210 based on the subscription information.

In some implementations, network device 220 may periodically verify that network device 220 is to continue to provide content objects to user device 210. For example, network device 220 may verify by transmitting a message, such as a subscription query message, to user device 210 to determine whether a user of user device 210 desires to remain subscribed to content or whether user device 210 remains connected to a network served by network device 220. In some implementations, network device 220 may provide a message for display to the user requesting the user to indicate whether network device 220 is to continue to provide the content objects. For example, the user may indicate to remove the subscription or may fail to provide an indication relative to a threshold amount of time, in which case network device 220 may cease providing the content objects to user device 210. As another example, the user may indicate to maintain the subscription, in which case network device 220 may continue to provide the content objects to user device 210.

In some implementations, user device 210 may provide the indication to network device 220 to remove or maintain the subscription. For example, user device 210 may indicate to remove the subscription when user device 210 is not providing the content objects for display, such as when the user is not streaming the content. As another example, user device 210 may indicate to maintain the subscription when user device 210 is providing the content objects for display, such as when the user is streaming the content. This conserves computing resources and network resources by preventing network device 220 from receiving content objects for and/or providing unnecessary content objects to user device 210.

In some implementations, network device 220 may determine network information associated with receiving and/or providing the content objects. For example, network device 220 may determine latency, jitter, packet loss, bit error rate, network device availability, a status of a connection, such as a communication session, or a network device (e.g., up or down), or a quantity of data being received and/or provided. In some implementations, devices, such as user device 210, network device 220, and/or content delivery server 240, may exchange a manifest file that records timestamps corresponding to when the devices receive and/or provide content objects.

In some implementations, network device 220 may use the manifest file to determine latency and may provide information that indicates the latency to controller device 230. Additionally, or alternatively, network device 220 may provide the manifest file to controller device 230 to determine an inconsistency of receipt of content objects across user devices 210 (e.g., to ensure that user devices 210 are receiving the same content objects when the subscription information overlaps), as described below.

In some implementations, network device 220 may receive an indication to provide content objects that network device 220 has previously provided to user device 210. For example, network device 220 may receive a negative acknowledgement indicating that user device 210 failed to receive one or more particular content objects (e.g., due to a down or congested connection). As another example, a user of user device 210 may interact with user device 210 to indicate a desire to replay or rewind content by requesting particular content objects previously provided to user device 210.

In some implementations, when user device 210 is requesting content objects previously provided, user device 210 may use the instructions for identifying the content objects to determine particular content object identifiers to request. For example, user device 210 may use the content object identifier of the latest received content object and the instructions to determine the content object identifier of a previously provided content object. Assume, for example, that the content object identifier of the latest received content object is "100" and that the instructions indicate that the content object identifiers are generated based on the order of the content objects (e.g., where "100" identifies the 100th content object). In some implementations, if user device 210 received an indication from a user to rewind the content by 20 content objects (e.g., representing 20 seconds), user device 210 may identify content object 80 as the content object to request or to start the replay. Additionally, or alternatively, user device 210 may use a formula or function (e.g., a pre-established formula or function) to identify content object identifiers to request, such as when content object identifiers are not sequentially ordered.

In some implementations, user device 210 may request the particular content objects from network device 220 using the content object identifiers in association with identifying particular content objects to request. In some implementations, when network device 220 receives a request for the particular content objects from user device 210, network device 220 may provide the content objects (e.g., from a cache) or re-request the particular content objects from content delivery server 240.

In some implementations, network device 220 may receive a request from user device 210 to provide content objects based on content object tags included in the content object identifier. Additionally, or alternatively, network device 220 may receive a request from user device 210 to provide content objects based on content object tags included in a manifest file published by content delivery server 240. For example, assume that the content objects are associated with a sporting event and that particular content objects are tagged as "team entrance" based on being associated with showing one or more teams entering a playing field, a playing court, a stadium, etc. In this case, network device 220 may receive a request from user device 210 that indicates a request for "team entrance" content objects.

In some implementations, content object tags may be associated with other non-sporting events. For example, the content object tags may be associated with an awards ceremony and may permit user device 210 to request content objects associated with a particular award being presented or a particular person entering a stage. As another example, the content object tags may be associated with a speech and may permit user device 210 to request content objects associated with particular statements during the speech. As another example, the content object tags may be associated with a television show or a movie and may permit user device 210 to request content objects associated with particular scenes, particular actors and/or actresses, or famous dialogue.

In some implementations, content objects may be associated with multiple content object tags. For example, content objects for a team entrance may be associated with content object tags for each of the teams, content object tags for each commentator for the game, or content object tags for particular players on the team. In some implementations, when network device 220 receives a request for content objects based on content object tags, network device 220 may request and provide the content objects using the content object tags.

In this way, a network device 220 may request and receive content objects from a content delivery server using an aggregated subscription or content object tags, which conserves network resources and computing resources of network device 220 by reducing a quantity of requests from network device 220 for content objects.

As further shown in FIG. 4, process 400 may include receiving an indication to modify the subscription information and/or the aggregated subscription information (block 450) and modifying the subscription information and/or the aggregated subscription information (block 460). For example, network device 220 may receive an indication to modify the start time, end time, or bit rate level for the subscription information and/or the aggregated subscription information. In some implementations, network device 220 may receive the indication from user device 210 or another network device 220.

In some implementations, user device 210 and/or network device 220 may modify or delete the subscription information and/or the aggregated subscription information. For example, network device 220 may modify or delete subscription information when network device 220 receives a modified interest indicator from user device 210 (e.g., an interest indicator that is modified from "/namespace/ABC/*" to "/namespace/XYZ/*"). As another example, network device 220 may receive an indication from user device 210 to modify the start time, the end time, and/or the bit rate level of the subscription information and/or the aggregated subscription information. As another example, network device 220 may delete the subscription information and modify the aggregated subscription information when user device 210 receives an indication that the user no longer desires to receive the content objects and/or when network device 220 has completed providing the content objects to user device 210. This conserves memory resources of network device 220 by deleting the subscription information and/or the aggregated subscription information when the content objects are no longer being requested and/or provided.

In this way, network device 220 may modify and/or delete subscription information and/or aggregated subscription information, which conserves computing resources of network device 220 by reducing or eliminating unnecessary requests for content objects.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
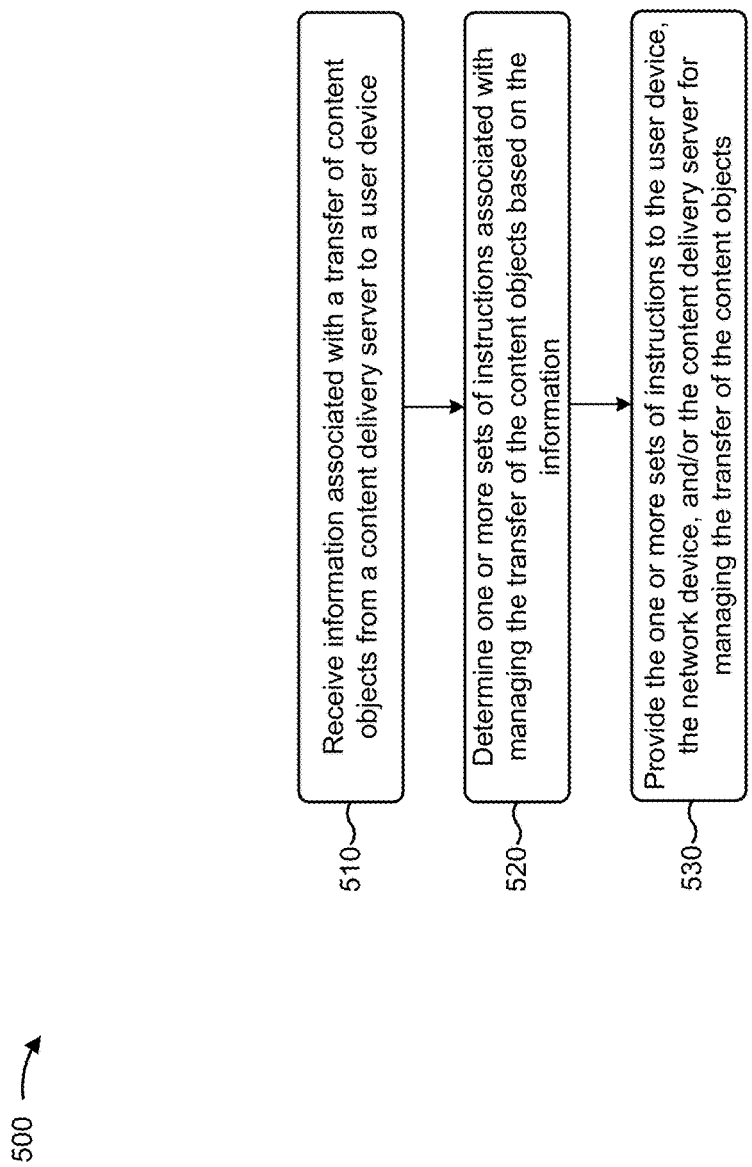
FIG. 5 is a flow chart of an example process for determining and providing one or more sets of instructions associated with managing a transfer of content objects.

FIG. 5 is a flow chart of an example process 500 for determining and providing one or more sets of instructions for managing a transfer of content objects. In some implementations, one or more process blocks of FIG. 5 may be performed by controller device 230. In some implementations, one or more process blocks of FIG. 5 may be performed by another device or a group of devices separate from or including controller device 230, such as user device 210, network device 220, and/or content delivery server 240.

As shown in FIG. 5, process 500 may include receiving information associated with a transfer of content objects from a content delivery server to a user device (block 510), determining one or more sets of instructions associated with managing the transfer of the content objects based on the information (block 520), and providing the one or more sets of instructions to the user device, the network device, and/or the content delivery server for managing the transfer of the content objects (block 530). For example, controller device 230 may receive network information, subscription information, or aggregated subscription information from network device 220. In some implementations, controller device 230 may use the information to determine the one or more sets of instructions.

In some implementations, controller device 230 may receive network information. In some implementations, controller device 230 may identify alternative connections for receiving and/or providing the content objects based on the network information. For example, controller device 230 may identify alternative connections that reduce latency based on the network information, thereby improving a transmission of content objects. As another example, controller device 230 may determine a status of a particular connection between two network devices or a status of a network device. In some implementations, when controller device 230 is determining the status, controller device 230 may determine whether the particular connection or network device is up or down and/or connected or disconnected.

In some implementations, when controller device 230 determines that the particular connection or network device is down or otherwise malfunctioning, controller device 230 may identify one or more alternative connections that avoid the particular down connection or network device. For example, assume that controller device 230 determines that a first connection between a first network device 220 and user device 210 is down. In this case, controller device 230 may determine alternative connections for providing the content objects to user device 210. For example, controller device 230 may determine that the first network device 220 can avoid the down connection by providing the content objects to a second network device 220, which may provide the content objects to user device 210. This conserves computing resources of network device 220 by preventing network device 220 from attempting to provide content objects via a down connection and/or network device 220. In some implementations, controller device 230 may provide instructions to network device 220 and/or content delivery server 240 for using the alternative connections.

In some implementations, controller device 230 may receive information associated with determining an inconsistency of storage of subscription information and/or aggregated subscription information. In some implementations, controller device 230 may determine whether subscription information and/or aggregated subscription information is stored consistently by network devices 220. For example, controller device 230 may determine whether aggregated subscription information stored by a first network device 220 is inconsistent with subscription information stored by one or more other network devices 220. In some implementations, when controller device 230 determines that subscription information and aggregated subscription information is stored inconsistently, controller device 230 may provide instructions to network devices 220 that may enable network devices 220 to modify subscription information and/or aggregated subscription information so that the subscription information and/or aggregated subscription information is stored consistently.

In some implementations, controller device 230 may receive information associated with determining an inconsistency of providing content objects to user device 210. For example, the information may enable controller device 230 to determine whether two or more user devices 210 that are to receive the same content objects during a time period are receiving the same content objects during the time period (e.g., by receiving and comparing content object identifiers of content objects received by the two or more user devices 210). As another example, the information may enable controller device 230 to ensure that the addition and/or removal of network devices and/or subscription information does not disrupt the providing of content objects to user devices 210, thereby ensuring continuity of content objects from content delivery server 240 to user device 210.

In some implementations, when controller device 230 determines that content objects are being provided to user devices 210 inconsistently, controller device 230 may adjust the manner in which content objects are provided to user devices 210. For example, controller device 230 may adjust the path via which content objects are provided from content delivery server 240 to user device 210. In some implementations, when controller device 230 adjusts the manner in which content objects are provided to user devices 210, controller device 230 may provide instructions to the network devices 220 that indicate the adjustment.

In some implementations, controller device 230 may receive subscription information and/or aggregated subscription information. In some implementations, controller device 230 may determine a manner of providing content objects based on the subscription information and/or the aggregated subscription information. In some implementations, controller device 230 may provide instructions to the network devices that indicate the manner of providing the content objects to user device 210.

Additionally, or alternatively, controller device 230 may determine whether the manner in which the content objects are being provided to user device 210 is efficient. For example, controller device 230 may determine whether the manner of providing the content objects minimizes a quantity of network devices via which the content objects are provided or minimizes latency associated with providing the content objects. In some implementations, controller device 230 may modify the manner of providing the content objects to user device 210 based on determining that the content objects are not being provided to user device 210 efficiently. In some implementations, controller device 230 may provide instructions to network devices 220 that indicate a modified manner of providing the content objects, such as instructions that increase an efficiency of providing content objects.

In some implementations, controller device 230 may receive the subscription information and/or the aggregated subscription information to request and/or provide content objects. For example, controller device 230 may receive the subscription information when network device 220 becomes overloaded with requesting and/or providing content objects. In some implementations, when controller device 230 receives the subscription information and/or the aggregated subscription information, controller device 230 may request and/or provide content objects in a manner similar to that described above with respect to FIG. 4.

In some implementations, controller device 230 may communicate with other networks to enable the requesting and/or providing of content objects via the multiple networks. For example, controller device 230 may perform handshaking with devices of the multiple networks or obtain permission for the network devices to request and/or provide content objects via the other networks. This increases an efficiency of providing content objects via the multiple networks by having controller device 230 communicate with the multiple networks (e.g., rather than having all network devices communicate with the multiple networks when requesting and providing content objects).

In this way, controller device 230 may manage a transfer of content objects to user device 210 by determining one or more sets of instructions associated with managing the transfer of content objects.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Implementations described herein may enable a network device to aggregate subscription information associated with requests for content objects. This conserves network resources and computing resources of the network device by preventing the network device from requesting the same content objects multiple times for multiple user devices. Further, this enables a user device to subscribe to content, thereby increasing an efficiency of requesting content objects by reducing and/or eliminating the need for the user device to request the content objects using a content object identifier.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, or equal to the threshold.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
receive first subscription information associated with a first request for content objects by a first user device, the first subscription information including:
a first interest indicator that identifies the content objects using a namespace indicator, and
information identifying a first time period associated with a first start time and a first end time;
receive second subscription information associated with a second request for the content objects by a second user device, the second subscription information including:
a second interest indicator that identifies the content objects using the namespace indicator, and
information identifying second time period associated with a second start time and a second end time;
store the first subscription information and the second subscription information;
aggregate, based on an overlap between the first time period and the second time period, the first subscription information with the second subscription information to form aggregated subscription information;
provide the aggregated subscription information to a content delivery server,
the aggregated subscription information including:
a third interest indicator that identifies the content objects using the namespace indicator, and
information identifying a third time period associated with a third start time and a third end time;
request the content objects from the content delivery server using the aggregated subscription information;
receive the content objects based on the aggregated subscription information;
provide, based on the aggregated subscription information, the content objects to the first user device during the first time period; and
provide, based on the aggregated subscription information, the content objects to the second user device during the second time period.

2. The device of claim 1, where the one or more processors, when aggregating the first subscription information with the second subscription information, are to:
aggregate the first subscription information with the second subscription information based on interests indicated by the first subscription information and the second subscription information.

3. The device of claim 1, where the one or more processors, when aggregating the first subscription information with the second subscription information, are to:
aggregate the first subscription information with the second subscription information based on attributes indicated by the first subscription information and the second subscription information.

4. The device of claim 1, where the one or more processors are further to:
receive a manifest file associated with the aggregated subscription information,
the manifest file including information associated with requesting the content objects; and
provide the manifest file to one or more user devices associated with the aggregated subscription information.

5. The device of claim 4, where the manifest file includes:
one or more instructions for identifying the content objects,
one or more content object tags, or
one or more content object identifiers.

6. The device of claim 1, where the one or more processors are further to:
receive at least one of a modified first interest indicator or a modified second interest indicator; and
modify the aggregated subscription information based on the at least one of the modified first interest indicator or the modified second interest indicator.

7. A non-transitory computer-readable medium storing instructions, the instructions comprising:
one or more instructions that, when executed by one or more processors, cause the one or more processors to:
receive, from a first device, first subscription information associated with a first request for content provided by a second device, the first subscription information including:
a first interest indicator that identifies the content using a namespace indicator, and
information identifying a first time period associated with a first start time and a first end time;
receive, from one or more third devices, second subscription information associated with a second request for the content provided by the second device, the second subscription information including:
a second interest indicator that identifies the content using the namespace indicator, and
information identifying a second time period associated with a second start time and a second end time;
aggregate, based on an overlap between the first time period and the second time period, the first subscription information with the second subscription information to form aggregated subscription information;
provide the aggregated subscription information to the second device,
the aggregated subscription information including:
a third interest indicator that identifies the content using the namespace indicator, and
information identifying a third time period associated with a third start time and a third end time;
request the content from the second device using the aggregated subscription information;
receive the content from the second device based on the aggregated subscription information;
provide at least some of the content to the first device, during the first time period, based on the first subscription information; and
provide at least some of the content to the one or more third devices, during the second time period, based on the second subscription information.

8. The non-transitory computer-readable medium of claim 7, where the one or more instructions, that cause the one or more processors to aggregate the first subscription information with the second subscription information, cause the one or more processors to:
aggregate the first subscription information, including first information that indicates the first interest indicator, and the second subscription information, including second information that indicates the second interest indicator,
the first subscription information and the second subscription information being aggregated based on the first interest indicator matching the second interest indicator.

9. The non-transitory computer-readable medium of claim 7, where the one or more instructions, that cause the one or more processors to aggregate the first subscription information with the second subscription information, cause the one or more processors to:
aggregate the first subscription information, including first information that includes a first attribute indicator, and the second subscription information, including second information that includes a second attribute indicator,
the first subscription information and the second subscription information being aggregated based on the first attribute indicator corresponding to the second attribute indicator.

10. The non-transitory computer-readable medium of claim 9, where the first attribute indicator or the second attribute indicator identifies at least one of:

a start time for receiving the content,
an end time for receiving the content, or
a bit rate level associated with receiving the content.

11. The non-transitory computer-readable medium of claim 7, where the one or more instructions, that cause the one or more processors to request the content, cause the one or more processors to:
    determine a start time for the aggregated subscription information,
        the start time indicating when the first device is to begin receiving the content; and
    request the content from the second device based on the start time.

12. The non-transitory computer-readable medium of claim 7, where the one or more instructions, that cause the one or more processors to request the content, cause the one or more processors to:
    determine an end time for the aggregated subscription information,
        the end time indicating when the first device is to cease receiving the content; and request the content from the second device based on the end time.

13. The non-transitory computer-readable medium of claim 7, where the aggregated subscription information includes:
    an attribute indicator associated with one or more attributes relating to providing the content.

14. A method, comprising:
    receiving, by a device, first subscription information from a first user device, the first subscription information including:
        a first interest indicator that identifies first content using a namespace indicator, and
        data identifying a first time period associated with a first start time and a first end time;
    receiving, by the device, second subscription information from a second user device, the second subscription information including:
        a second interest indicator that identifies the first content using the namespace indicator, and
        data identifying a second time period associated with a second start time and a second end time;
    aggregating, by the device and based on an overlap between the first time period and the second time period, the first subscription information and the second subscription information to form aggregated subscription information;
    providing, by the device, the aggregated subscription information to a content delivery server,
        the aggregated subscription information including:
            a third interest indicator that identifies the first content using the namespace indicator, and
            data identifying a third time period associated with a third start time and a third end time;
    obtaining, by the device, the first content from the content delivery server based on the aggregated subscription information;
    providing, by the device, a first portion of the first content to the first user device during the first time period; and
    providing, by the device, a second portion of the first content to the second user device during the second time period.

15. The method of claim 14, where aggregating the first subscription information and the second subscription information comprises:
    determining that the first subscription information and the second subscription information are associated with a same interest indicator;
    determining the third start time for the aggregated subscription information based on one of the first subscription information or the second subscription information; and
    determining the third end time for the aggregated subscription information based on one of the first subscription information or the second subscription information.

16. The method of claim 14, where providing the first portion of the first content comprises:
    providing the first portion of the first content to the first user device based on the first subscription information.

17. The method of claim 14, where providing the second portion of the first content comprises:
    providing the second portion of the first content to the second user device based on the second subscription information.

18. The method of claim 14, where the first portion of the first content and the second portion of the first content include a same portion of the first content.

19. The method of claim 14, where the first portion of the first content and the second portion of the first content include different content.

20. The method of claim 14, further comprising:
    receiving at least one of a modified first interest indicator or a modified second interest indicator; and
    modifying the aggregated subscription information based on the at least one of the modified first interest indicator or the modified second interest indicator.

* * * * *